Oct. 12, 1937.  H. D. PHILIPS  2,095,831
FILM DRIVING APPARATUS
Filed July 6, 1935
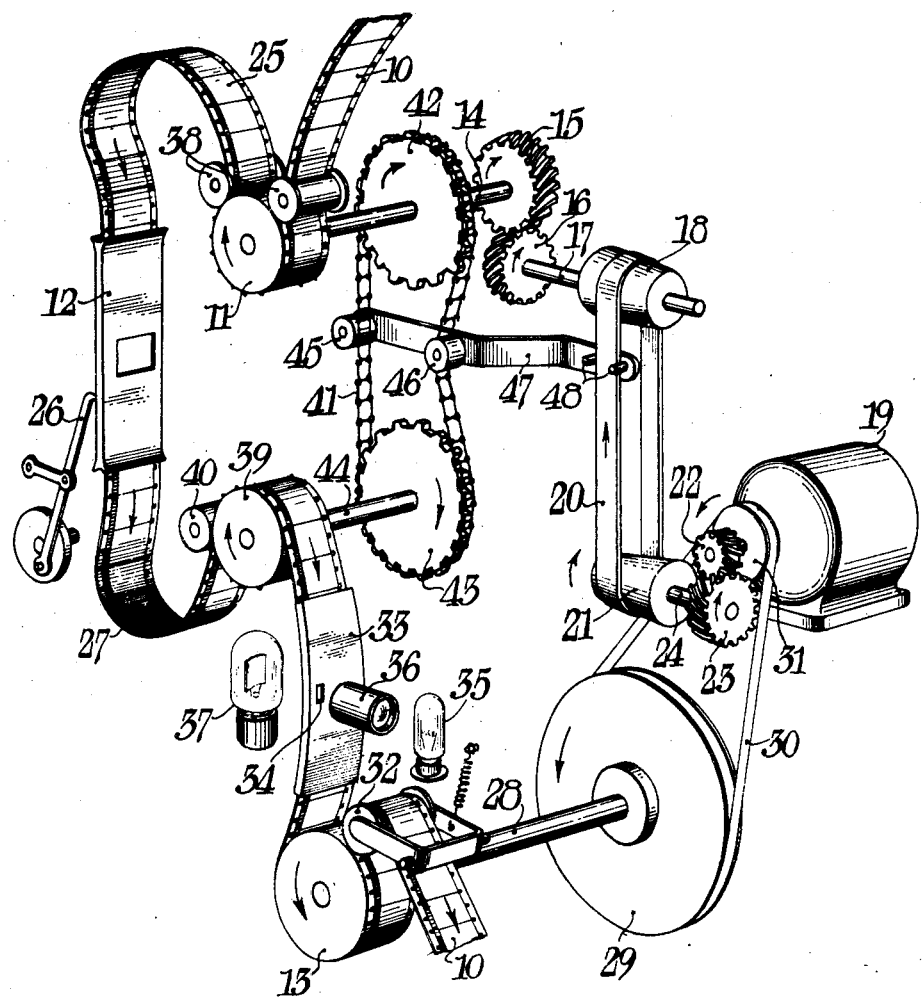
INVENTOR:
Harlow D. Philips,
BY Newton M. Perrins
Rolla N. Carter
ATTORNEYS.

Patented Oct. 12, 1937

2,095,831

UNITED STATES PATENT OFFICE 2,095,831

FILM DRIVING APPARATUS

Harlow D. Philips, Rochester, N. Y., assignor, by mesne assignments, to Eastman Kodak Company, Jersey City, N. J., a corporation of New Jersey Application July 6, 1935, Serial No. 30,203

2 Claims. (Cl. 88—16.2)

My invention relates to film handling apparatus in which the film is advanced serially past two stations, at one of which stations the film is advanced intermittently and is advanced non-intermittently at the other station. The apparatus of my invention is peculiarly adapted for use in sound motion picture apparatus in which the film is advanced intermittently past the picture projecting gate and is advanced continuously past the sound reproducing gate. For moving the film it is usually provided with sprocket tooth perforations along one or both of its edges which are adapted to engage with the teeth of suitable sprocket wheels over which it is trained in passing from the supply to the take-up reels.

In order to advance the film with as uniform a motion as possible past the sound reproducing station, it is generally desirable to employ a belt-type drive, that is, one in which a smooth surfaced wheel or drum engages the film rather than a sprocket wheel. However, when a sprocket wheel is employed for advancing the film to the picture loop, some precautionary measures are necessary to make certain that the same total length of film is advanced by the sprocket wheel as is advanced by the drum, since otherwise, due to film shrinkage or slight differences in the pitch of the sprocket wheel or in the diameter of the drum, one of the drives will invariably advance the film at a greater rate than will the other. This difference in drive will result in either increasing or decreasing the length of film in the picture loop with the obvious disadvantages, and in addition, will destroy the synchronism between the sound being reproduced and the picture being projected, inasmuch as it is standard practice to have a picture and its corresponding sound spaced a definite distance along the length of the film.

It is an object of my invention to provide an improved apparatus for moving a sound record film by means of a sprocket wheel and a drum whereby the above-mentioned difficulties may be avoided. Another object of my invention is to provide such apparatus with a uniformly driven drum for advancing the film past the sound station and a variable speed connection for driving the sprocket wheel which advances the film to the picture loop. Another object of my invention is the provision of means controlled by the number of perforations passing the sound gate to regulate the variable speed connection to the sprocket wheel drive whereby it will advance into the picture loop a length of film having the same number of perforations. Other objects and advantages of my invention will be apparent from the following description when read in connection with the accompanying drawing, the single figure of which shows in perspective a portion of a picture projecting and sound reproducing apparatus involving my invention.

In the apparatus as shown, a film 10 passes over and is adapted to be advanced by a sprocket wheel 11 through a picture projecting guide 12 around a drum 13, suitable reels (not shown) being provided from which and to which the film is wound. It is to be understood that those portions of the complete apparatus which form no part of my invention and which are unnecessary to the complete understanding thereof have been omitted since their inclusion in the drawing would obscure rather than make clear the invention. The sprocket 11 carries on its shaft 14 a spiral gear 15 which meshes with a spiral gear 16 carried on the same shaft 17 as a cone pulley 18 and is adapted to be driven by a suitable motor 19 through a belt 20 trained over the pulley 18 and a second cone pulley 21, which latter pulley is connected to a spiral gear 22 carried on the shaft of the motor 19 through a spiral gear 23 and its shaft 24.

By means of the above arrangement, the sprocket 11 is rotated to advance the film 10 into an upper loop 25 from which it is drawn through the picture projecting guide 12 by a suitable intermittent mechanism 26 and discharged into a lower loop 27. The belt-type drive or drum 13 carries on its shaft 28 a pulley wheel 29 which is connected by means of a belt 30 to a pulley wheel 31 carried by the shaft of the motor 19. The film 10 is looped around the drum 13, and it is caused to be held in frictional contact therewith by means of a spring-pressed idler roller 32. Rotation of the drum 13 pulls the film 10 from the lower loop 27 and through a suitable sound gate 33 containing an aperture 34, through which a light beam coming from a lamp 35 is projected by an objective 36. Arranged behind the sound aperture 34, a suitable light-sensitive cell 37 is positioned to receive the light beam as varied by the sound record passing through the light beam at the sound aperture 34. It will be understood that the particular arrangement for taking the sound off of the film forms no part of my present invention and may be of any desired type, the arrangement shown being one that is well known.

Instead of taking the sound off at a point on the curved gate as shown, I may, of course, take it off at some other point, such as one while the film is in contact with the drum 13 by making this drum hollow and transparent, or by arranging the film to overhang the edge of the drum 13 as is well known.

In the apparatus as shown, the film 10 is drawn from the supply reel by the sprocket 11, against which it is held by idlers 38, thence to loop 25, the picture projecting guide 12, and the lower loop 27. In order to maintain constant the length of the film in the two loops 25 and 27, a sprocket 39 is positioned to be engaged and driven by the film as it leaves the lower loop 27 and just before it enters the sound gate 33. An idler 40 may be provided for holding the film 10 against the sprocket 39, and it will be apparent from the drawing that the tension imparted to the film by the drum 13 will rotate the sprocket 39 at a speed which corresponds exactly to the speed of the film as it passes the sound aperture 34. Accordingly, the speed of the sprocket 39 may be employed to control the speed of the sprocket 11 and thereby insure that the total length of film advanced by the sprocket 11 will be the same as that advanced by the drum 13.

The mechanism with which this control may be secured comprises an endless flexible connection, such as a chain 41, between two members 42 and 43 carried by the shaft 14 and the shaft 44 of the sprocket 39. The members 42 and 43 which are here shown as sprocket wheels will be driven individually by their respective shafts, so that if the shaft 14 rotates at the greater speed, the chain sprocket wheel 42 will tend to drive the chain sprocket wheel 43 and, as shown in the drawing, one of the free lengths of the chain 41 will be under tension while the other free length will be slack. It naturally follows that if the wheel 43 tends to drive the wheel 42, the opposite will be true. This resulting tension of the chain 41 is employed to control the position of the belt 20 on the cone pulleys 18 and 21 by means of a pair of dance rolls 45 and 46 carried by a bar 47, which is provided at one of its ends with two projecting pins 48 between which the belt 20 is adapted to pass. The bar 47 is mounted in any suitable manner (not shown) for longitudinal movement, so that as the tension in the chain 41 varies, the bar 47 and therefore the belt 20 will be moved to a position corresponding to this tension.

The action of this variable speed control mechanism may be illustrated as follows: With the apparatus running and the sprocket 11 rotating at a slightly greater speed than that of the conrol sprocket 39, the wheel 42 will tend to drive the wheel 43 and thereby place under tension the left hand portion of the chain 41 as shown in the drawing. This tension has straightened out this portion of the chain 41 and in doing so pressed against the dance roll 45 to move the bar 47 to the left. This movement of the bar 47 shifted the belt 20 so that it occupied a position of greater diameter on the cone pulley 18 and a smaller diameter on the cone pulley 21, thereby decreasing the speed at which the sprocket 11 is driven by the motor 19. If the speed of the sprocket 11 is reduced by too great an amount, the wheel 43 will tend to drive the wheel 42 and the right hand portion of the chain 41 will be shortened to shift the belt 20 in the opposite direction and thereby increase the speed of rotation of the sprocket 11. In actual practice, the dance rolls 45 and 46 will normally be held practically stationary in a position at which the speed ratio between the pulleys 18 and 21 will be such that the same total length of film is advanced by the sprocket 11 and the drum 13.

For the purpose of illustration I have shown my invention as applied to a combined sound motion picture reproducing apparatus, but it will be understood that it is equally applicable to a combined sound and picture recording apparatus as well as to any other apparatus in which it is desired to control the speed of a sprocket-type drive in accordance with the speed of a belt-type drive so that the same total length of film is advanced by both. The connection between the driving sprocket 11 and the control sprocket 39 has been shown as comprising a chain, but it will be obvious that any other suitable arrangement may be employed for detecting differences in the sprocket tooth speeds of these two sprockets. Other arrangements and modifications will be apparent to those skilled in the art without departing from the spirit of my invention, the scope of which is pointed out in the appended claims.

Having thus described my invention what I claim as new and desire to secure by Letters Patent of the United States is:

1. A combined picture projecting and sound reproducing apparatus including a picture gate, a sound gate, and means for advancing a film successively past said gates, said means comprising a driven sprocket for advancing the film into a loop above the picture gate, a driven drum for pulling the film from a loop below the picture gate and past the sound gate, an idler sprocket arranged to be engaged by the film as it leaves the lower loop, motor means for rotating the driven sprocket and the driven drum, a variable speed connection between the motor means and said driven sprocket, and means responsive to a difference in the linear speeds of the film as it passes over the two sprockets for regulating the variable speed connection.

2. Film driving apparatus for advancing two sections of a film at the same linear speed comprising a sprocket and a drum adapted to engage the film serially with a free loop of film therebetween, a motor for driving the sprocket and the drum, a variable speed connection between the motor and the sprocket, a second sprocket adapted to be rotated by the film as it approaches said drum, an endless chain, means rotatable with each of said sprockets for driving said chain, and means responsive to a change in the tension of said chain for controlling said variable speed connection.

HARLOW D. PHILIPS.